(12) United States Patent
Yahagi

(10) Patent No.: US 8,607,743 B2
(45) Date of Patent: Dec. 17, 2013

(54) INTERNAL COMBUSTION ENGINE

(75) Inventor: Hideo Yahagi, Gotemba (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 141 days.

(21) Appl. No.: 12/680,685

(22) PCT Filed: Oct. 30, 2008

(86) PCT No.: PCT/JP2008/069794
§ 371 (c)(1),
(2), (4) Date: Mar. 29, 2010

(87) PCT Pub. No.: WO2009/057711
PCT Pub. Date: May 7, 2009

(65) Prior Publication Data
US 2010/0212611 A1   Aug. 26, 2010

(30) Foreign Application Priority Data

Nov. 2, 2007   (JP) ................... 2007-285760

(51) Int. Cl.
*F02B 43/08* (2006.01)
(52) U.S. Cl.
USPC ............ 123/3; 123/2; 123/510; 123/514
(58) Field of Classification Search
USPC ............ 123/1 A, 2, 3, 510, 514; 60/320
See application file for complete search history.

(56) References Cited

U.S. PATENT DOCUMENTS

| | | | | |
|---|---|---|---|---|
| 4,143,620 A | * | 3/1979 | Noguchi et al. | 123/3 |
| 4,230,072 A | * | 10/1980 | Noguchi et al. | 123/1 A |
| 4,933,852 A | * | 6/1990 | Lemelson | 701/29.4 |
| 5,277,166 A | | 1/1994 | Freeland | |
| 5,343,699 A | * | 9/1994 | McAlister | 60/273 |
| 5,412,946 A | * | 5/1995 | Oshima et al. | 60/286 |
| 6,497,856 B1 | * | 12/2002 | Lomax et al. | 423/651 |
| 6,623,719 B2 | * | 9/2003 | Lomax et al. | 423/652 |
| 7,131,264 B2 | * | 11/2006 | Weissman et al. | 60/286 |
| 2007/0141417 A1 | * | 6/2007 | Bitoh | 429/23 |
| 2007/0204813 A1 | * | 9/2007 | Arai et al. | 123/25 A |
| 2008/0010993 A1 | * | 1/2008 | Morgenstern | 60/780 |
| 2008/0141984 A1 | * | 6/2008 | Haga | 123/525 |

FOREIGN PATENT DOCUMENTS

| | | | |
|---|---|---|---|
| EP | 1 688 608 A1 | | 8/2006 |
| JP | 55093952 A | * | 7/1980 |

(Continued)

OTHER PUBLICATIONS

Extended European Search Report issued on Jun. 24, 2011 in the corresponding European Application No. 08843884.1.

*Primary Examiner* — Noah Kamen
*Assistant Examiner* — Long T Tran
(74) *Attorney, Agent, or Firm* — Oblon, Spivak, McClelland, Maier & Neustadt, L.L.P.

(57) ABSTRACT

A fuel reforming catalyst is installed in an internal combustion engine, the catalyst generating a combustible gas from a reforming fuel by using heat of the exhaust gas. In the reforming control, the combustible gas generated by action of the fuel reforming catalyst is refluxed into the intake system. An ECU varies a lower limit temperature of the reforming control depending on a mixture ratio of a gasoline and an ethanol in the reforming fuel. If the temperature of the fuel reforming catalyst is lower than the lower limit temperature, the ECU suspends the injection of the reforming fuel. The device can enlarge a temperature range to perform reforming control as much as possible, and perform the reforming control under suitable temperature conditions.

10 Claims, 3 Drawing Sheets

(56) References Cited

FOREIGN PATENT DOCUMENTS

| JP | 05106498 A | * | 4/1993 |
| JP | 6 242839 | | 9/1994 |
| JP | 08177465 A | * | 7/1996 |
| JP | 2006-37745 | | 2/2006 |
| JP | 2006 226167 | | 8/2006 |
| JP | 2006 226267 | | 8/2006 |
| JP | 2006 291901 | | 10/2006 |
| JP | 2007 187066 | | 7/2007 |

* cited by examiner

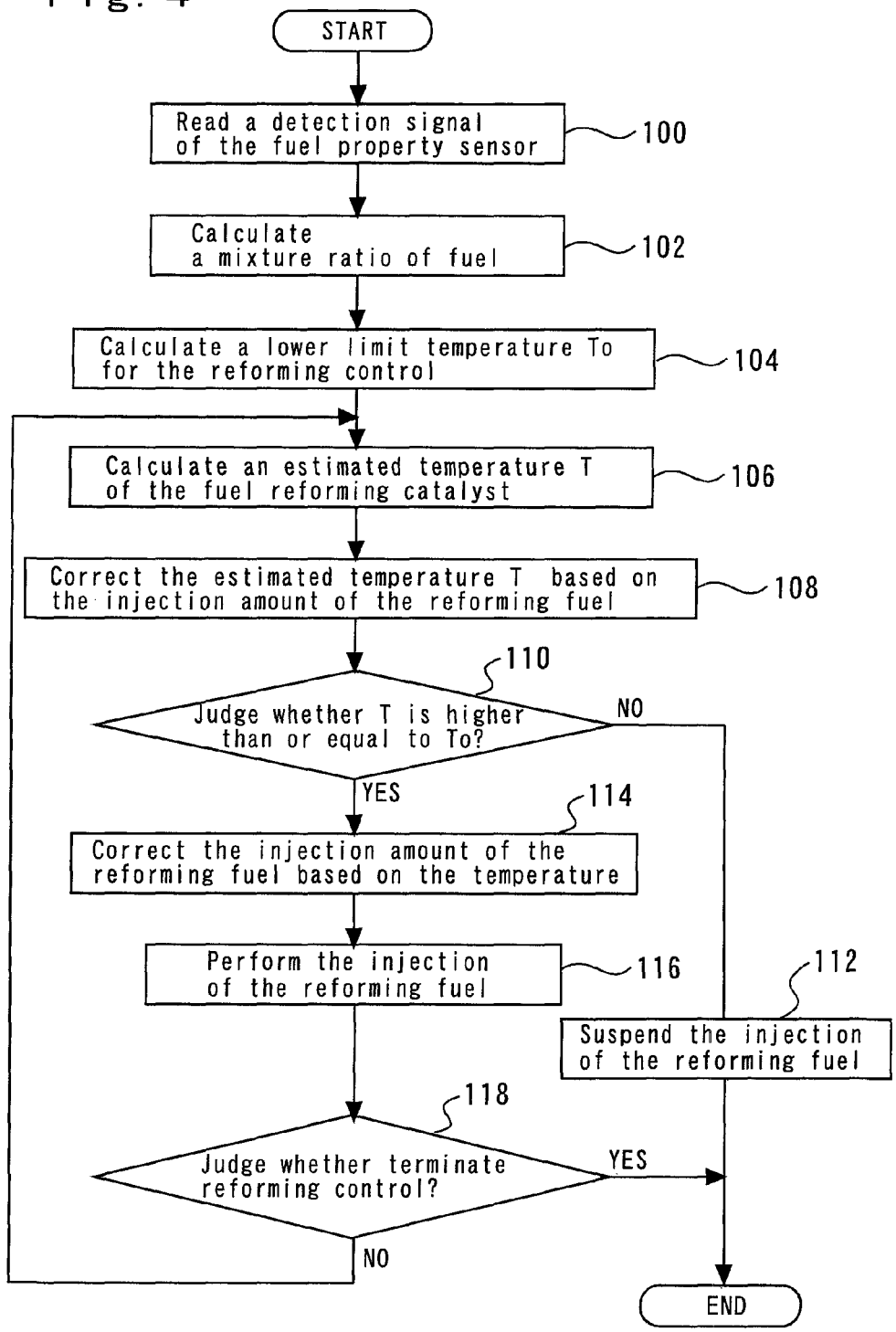

INTERNAL COMBUSTION ENGINE

TECHNICAL FIELD

The present invention relates to an internal combustion engine in which blended fuel of gasoline and alcohol is suitably used. More particularly, the present invention relates to an internal combustion engine in which combustible gas generated from fuel is added to air-fuel mixture.

BACKGROUND ART

An internal combustion engine that reforms fuel to combustible gas by using heat of exhaust gas is known as disclosed in, for example, Patent Document 1 (JP-A-2006-226167). Such a prior internal combustion engine is equipped with a fuel reforming catalyst for performing a control (reforming control) for generating combustible gas from fuel by utilizing the steam reforming reaction.

The fuel reforming catalyst can generate the combustible gas from fuel efficiently in a specific temperature range which is suitable for the reforming reaction. Therefore, in the prior art arrangement, operation control may be performed so that temperature of the catalyst is raised, or supply of the fuel to the catalyst is suspended when temperature of the fuel reforming catalyst is lower than the specific temperature.
[Patent Document 1] JP-A-2006-226167

DISCLOSURE OF INVENTION

Problem to be Solved by the Invention

In the above mentioned prior art, blend fuel of gasoline and alcohol may be used as a fuel subjected to the reforming control. In such an internal combustion engine, the temperature at which the reforming control can be performed is apt to be affected by a property of the fuel (a mixture ratio of gasoline and alcohol).

Therefore, there may arise a problem that the efficiency of the reforming control is deteriorated as a result that fuel supply to the fuel reforming catalyst is suspended even under a temperature at which the reforming control can be performed depending on a property of the fuel in the prior art arrangement. Also, there may be a possibility that the fuel is accidentally supplied to the fuel reforming catalyst even under a temperature that is too low to perform the reforming control. In this case, there arises a problem that the fuel is left in the catalyst, thereby worsening the exhaust emission.

The prevent invention has been made to solve the foregoing problem. And it is an object of the prevent invention to provide an internal combustion engine which can perform the reforming control at the suitable temperature for a property of the fuel, and improve the efficiency of the reforming control and the exhaust emission, in case of using a blended fuel of gasoline and alcohol.

Means for Solving the Problem

A first aspect of the present invention is an internal combustion engine, comprising:

a fuel reforming catalyst including a heating means, the fuel reforming catalyst generating a combustible gas from a reforming fuel by using heat of the heating means;

reforming fuel supplying means supplying blended fuel of gasoline and alcohol to the fuel reforming catalyst as the reforming fuel;

temperature acquisition means acquiring a temperature of the fuel reforming catalyst;

mixture ratio detecting means detecting a mixture ratio of the gasoline and the alcohol contained in the reforming fuel;

lower limit temperature calculating means variably set a lower limit temperature necessary to activate the fuel reforming catalyst based on the mixture ratio detected by the mixture ratio detecting means; and reforming fuel suspending means suspending supply of the reforming fuel when the temperature acquired by the temperature acquisition means is lower than the lower limit temperature.

In a second aspect of the present invention, the lower limit temperature calculating means is configured so as to set the lower limit temperature to be higher as the mixture ratio of the gasoline in the reforming fuel increases.

In a third aspect of the present invention, the temperature acquisition means estimate the temperature of the fuel reforming catalyst based on an operating condition of the internal combustion engine, and the internal combustion engine further comprising a estimated temperature correcting means correcting the estimated result of said temperature based on a supplying amount of the reforming fuel.

In a fourth aspect of the present invention, the estimated temperature correcting means correct the estimated result of said temperature so as to be lowered as the supplying amount of the reforming fuel increases.

In a fifth aspect of the present invention, the heating means includes a heat exchanger which heat the fuel reforming catalyst by using heat of the exhaust gas.

Advantages of the Invention

According to the first aspect of the present invention, the lower limit temperature calculating means can vary the lower limit of temperature at which the reforming control is performed depending on a mixture ratio of the reforming fuel. Further, it becomes possible to allow the injection of the reforming fuel only when the fuel reforming catalyst is in a suitable temperature and to suspend the injection of the reforming fuel in other temperature by performing a temperature judgment using the lower limit temperature.

Therefore, it is possible to enlarge the temperature range to perform the reforming control as much as possible so that the reforming control is always stably performed under a suitable temperature condition even in a case where the mixture ratio of the reforming fuel changes. Therefore, the efficiency of the reforming control is improved so that the fuel consumption efficiency and the exhaust emission are improved.

According to the second aspect of the present invention, the lower limit temperature calculating means can set the lower limit of temperature to be a higher value as the mixture ratio of gasoline in the reforming fuel increases. Therefore, for example, in a case where a fuel that has low reactivity for the reforming reaction because of a high gasoline content rate is used, the reforming control is executed only in a comparatively high temperature range. As a result, the reforming fuel is prevented from being injected under a low temperature condition that is unsuitable for the reforming reaction so that the fuel reforming catalyst is protected from adhesion of the fuel.

On the other hand, in a case where a fuel that has a low gasoline content rate (that is to say, a fuel that has a high alcohol content rate so as to have high reactivity for the reforming reaction) is used, the lower limit temperature calculating means can set the lower limit temperature to be a lower value depending on the mixture ratio of the fuel, thereby enlarging the temperature range to perform the reforming control as much as possible.

According to the third aspect of the present invention, the estimated temperature correcting means can correct an estimated result of a temperature of the fuel reforming catalyst based on a supplied amount of the reforming fuel. Therefore, it is possible to reflect the influence of evaporation of fuel in the estimated result of the temperature even if the fuel evaporates near the fuel reforming catalyst. Consequently, the temperature of the fuel reforming catalyst is precisely estimated. Therefore, the temperature judgment using the lower limit temperature is carried out precisely so that the reforming control is executed at an appropriate timing.

According to the fourth aspect of the present invention, an evaporation heat radiated from the fuel reforming catalyst when the reforming fuel evaporates increases as an injection amount of the reforming fuel increases. Therefore, the estimated temperature correcting means can correct the estimated result of the temperature to be lower as the supplying amount of the reforming fuel increases. Consequently, it is possible to precisely estimate the temperature of the fuel reforming catalyst even if the injection amount of the reforming fuel changes.

According to the fifth aspect of the present invention, the heat exchanger can heat the fuel reforming catalyst by using heat of exhaust gas. Therefore, it is possible to construct a system of exhaust gas heat collection type. According to this system, operating efficiency can be improved because that it is necessary to use neither heater nor heating energy for heating the catalyst.

BRIEF DESCRIPTION OF DRAWINGS

FIG. 4 is a flowchart of a routine performed in the first embodiment of the present invention.

Figure 1:
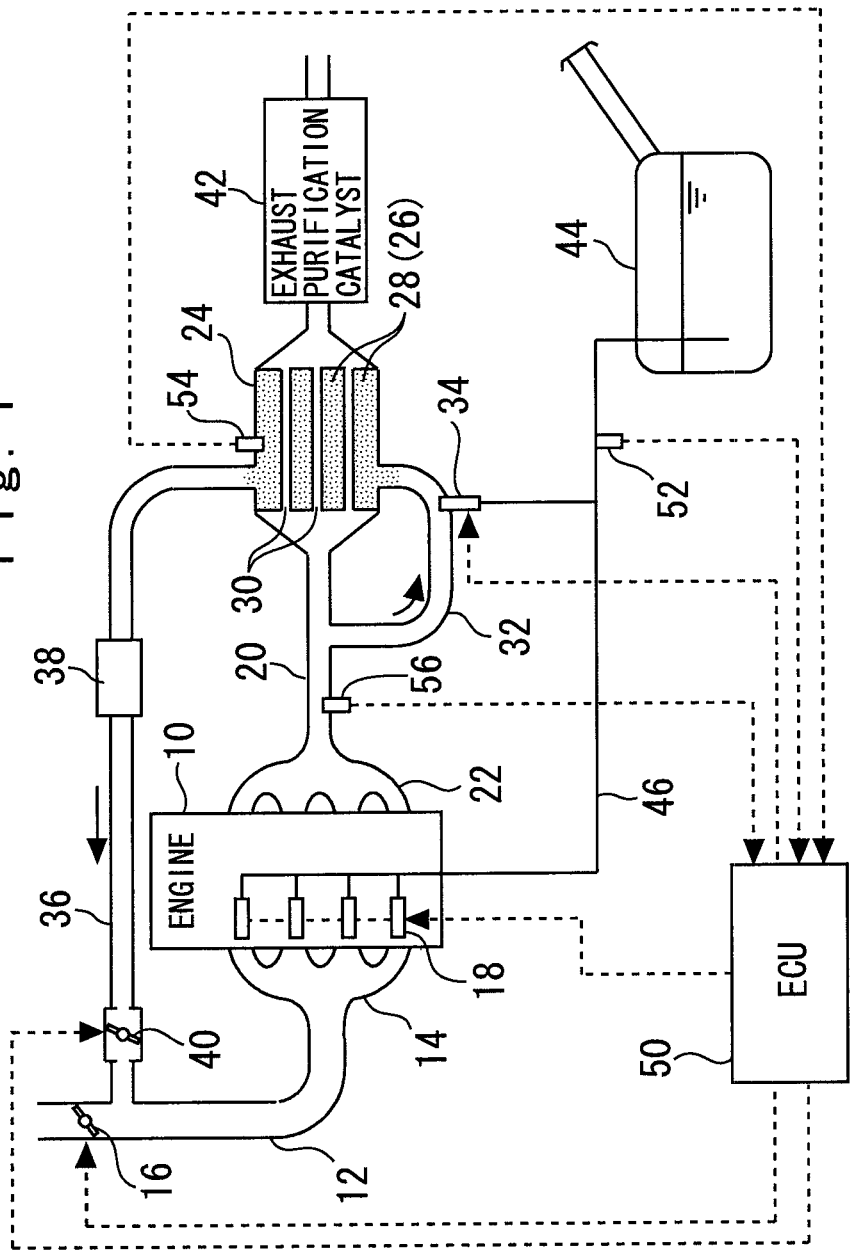
FIG. 1 is a figure of total configuration to describe the system configuration according to the first embodiment of the present invention.

DESCRIPTION OF REFERENCE NUMERALS 10 internal combustion engine, 12 intake pipe, 14 intake manifold, 16 throttle valve, 18 fuel injection device, 20 exhaust pipe, 24 heat exchanger (heating means), 26 reforming rooms, 28 reforming catalyst, 30 exhaust passages, 32 diverged pipe, 34 reforming fuel injector (reforming fuel supplying means), 36 reforming gas passage, 38 gas cooler, 40 flow regulation valve, 42 exhaust purification catalyst, fuel tank, 46 fuel pipe, 50 ECU, 52 fuel property sensor (mixture ratio detecting means), 54 catalyst temperature sensor, 56 exhaust gas sensor, $T_0$ lower limit temperature

BEST MODE FOR CARRYING OUT THE INVENTION

First Embodiment

Configuration of a First Embodiment

A first embodiment of the prevent invention will be described below with reference to FIGS. 1 through 4. FIG. 1 is a figure of total configuration to describe the system configuration of the first embodiment. The system of the first embodiment has an internal combustion engine 10 of a, for example, plural-cylinder type. The internal combustion engine 10 is run with blended fuel of gasoline and alcohol. In this embodiment, the blended fuel is made of gasoline and ethanol, for example.

An intake pipe 12 of the internal combustion engine 10 is connected to an intake port of every cylinder through an intake manifold 14. An electromotive-type throttle valve 16 to adjust an intake air quantity is installed in the middle of the intake pipe 12. Further, a fuel injection device 18 that is constituted by an electromagnetic valve is installed at the intake port of every cylinder to inject a fuel.

An exhaust pipe 20 of the internal combustion engine 10 is connected to an exhaust port of every cylinder through an exhaust manifold 22. A heat exchanger 24 as a heating means is installed in the middle of the exhaust pipe 20. A plurality of reforming rooms 26 are disposed in the heat exchanger 24 while being away by a distance from each other. Fuel reforming catalyst 28 containing a metal material such as Rh, Co or Ni is supported in the reforming rooms 26.

Exhaust passages 30 cut off from the reforming rooms 26 are provided between every reforming room 26. These exhaust passages 30 are connected to the middle of the exhaust pipe 20. According to the heat exchanger 24 configured in this way, it is possible to heat the reforming rooms 26 (the fuel reforming catalyst 28) by using heat of exhaust gas passing through the exhaust passage 30. By this heat, the fuel reforming catalyst 28 can cause the reforming reaction.

A diverged pipe 32 is connected to the exhaust pipe 20. The diverged pipe 32 is diverged from the exhaust pipe 20 at the upstream side of the heat exchanger 24. The downstream side of the diverged pipe 32 is connected to the reforming room 26 of the heat exchanger 24. A reforming fuel injector 34 as a reforming fuel supplying means is installed in the middle of the diverged pipe 32. The reforming fuel injector 34 is constituted by an electromagnetic valve so as to inject and supply fuel (hereinafter referred to as a "reforming fuel") into exhaust gas flowing through the diverged pipe 32.

According to this configuration, apart of the exhaust gas flowing through the exhaust pipe 20 is led into the reforming room 26 via the diverged pipe 32, and is supplied with reforming fuel by the reforming fuel injector 34. The mixture gas of these exhaust gas and reforming fuel flows into the reforming room 26, and causes a reforming reaction described later by an effect of the fuel reforming catalyst 28.

Reformed gas generated by the reforming reaction is recirculated into the intake pipe 12 through a reforming gas passage 36 so as to be mixed with intake air. A gas cooler 38 for cooling down the reforming gas and an electromagnetic flow regulation valve 40 for regulating a recirculation volume of the reformed gas are installed in the reforming gas passages 36.

Leftover exhaust gas which does not flow into the diverged pipe 32 among the exhaust gas flowing through the exhaust pipe 20 passes the exhaust passage 30 of the heat exchanger 24 so as to supply heat to the reforming room 26. Then, the exhaust gas is purified by an exhaust purification catalyst 42 constituted by a three way catalyst or the like while being installed in the exhaust pipe 20, thereafter being exhausted to outside.

In the internal combustion engine 10, a blended fuel of gasoline and alcohol is reserved in a fuel tank 44. A fuel pump (not shown by diagram) for pressurizing fuel in the tank to send it out is attached to the fuel tank 44. A fuel pipe 46 for supplying the fuel discharged from the fuel pump to the fuel injection device 18 and the reforming fuel injector 34, respectively is connected to the discharge side of the fuel pump.

Additionally, the system of the first embodiment has an ECU (Electronic Control Unit) 50. The ECU 50 is constituted by a microcomputer having a memory circuit such as ROM and RAM. A sensor system including a fuel property sensor 52, a catalyst temperature sensor 54, an exhaust gas sensor 56 and the like is connected to the input side of the ECU 50.

The fuel property sensor 52 is installed in, for example, the fuel pipe 46 so as to constitute a mixture ratio detecting means which detect a mixture ratio of gasoline and alcohol in the fuel. The catalyst temperature sensor 54 is installed in the reforming room 26 of the heat exchanger 24 so as to detect a temperature of the reforming room 26 (the fuel reforming catalyst 28). The exhaust gas sensor 56 is installed in the exhaust pipe 20 so as to output a detection signal corresponding to the oxygen density in the exhaust gas.

Moreover, the sensor system includes some general sensors used in operation control of the internal combustion engine 10 such as a rotary sensor for detecting an engine speed, an air flow meter for detecting an intake air quantity, a water temperature sensor for detecting a temperature of an engine coolant water, an accelerator position sensor for detecting a position of an accelerator.

On the other hand, various actuators including the above-described throttle valve 16, the fuel injection device 18, the reforming fuel injector 34 and the flow regulating valve 40 are connected to the output side of the ECU 50. Further, the ECU 50 performs an operation control by driving the various actuators while detecting operating conditions of the internal combustion engine 10 through the sensor system.

In this operation control, injection amount of fuel is calculated based on an intake air quantity or the like so as to inject the fuel corresponding to the calculated result from the injection device 18. In addition, the air-fuel ratio of the exhaust gas flowing into the exhaust purification catalyst 42 is controlled so as to substantially coincident with the theoretical air fuel ratio by performing an air-fuel ratio feedback control while using a detected signal of the exhaust gas sensor 56.

(The Reforming Control)

As follows, the ECU 50 performs a reforming control so that combustible gas (reformed gas) generated by the reforming reaction between exhaust gas and reforming fuel is recirculated into the intake pipe 12. In the reforming control, mixture gas generated by injecting the reforming fuel via the reforming fuel injector 34 into the exhaust gas flowing through the diverged pipe 32 is supplied to the reforming room 26. Then, the ECU 50 calculates an injection amount (supply amount) of the reforming fuel based on, for example, an operating condition of the internal combustion engine 10, the mixture ratio of the fuel, the temperature of the fuel reforming catalyst 28 and the like.

As a result, ethanol in the mixture gas causes the reforming reaction (the steam reforming reaction) in the reforming room 26 with steam and carbon dioxide in the exhaust gas by an effect of the fuel reforming catalyst 28. As shown in the following chemical equation (1), The steam reforming reaction generates hydrogen ($H_2$) and carbon monoxide (CO).

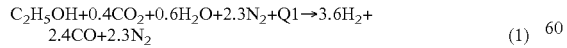
(1)

On the other hand, gasoline in the mixture gas also causes the reforming reaction with a steam and a carbon dioxide in the exhaust gas, as shown in the following chemical equation (2).

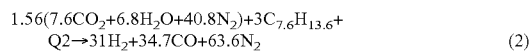
(2)

The heat quantity Q1 in the chemical equation (1) and the heat quantity Q2 in the chemical equation (2) are quantities of reaction heat absorbed during the reforming reaction. Namely, the heat quantities included in the reformed gas shown in the right side of the above chemical equations (1) and (2) is larger than the heat quantities included in the materials shown in the left side of these equations since these reforming reactions are the endothermic reaction.

Accordingly, the heat exchanger 24 can transmit a heat of the exhaust gas flowing through the exhaust passage 30 to the reforming room 26 (the fuel reforming catalyst 28) so that the heat is absorbed by the above reforming reaction. In other words, the system of the first embodiment can convert the reforming fuel into the materials ($H_2$ and CO) which have enlarged heat quantity by correcting and utilizing the heat of the exhaust gas.

It is to be noted that the fuel reforming catalyst 28 is required to be, for example, equal to or more than 600 degrees Celsius in order to start the reforming reaction since the heat quantity Q2 necessary for the gasoline reforming reaction is very large. Therefore, during the internal combustion engine 10 runs, the ethanol reforming reaction occurs stably over a wide operating zone. On the other hand, the gasoline reforming reaction occurs efficiently only in the high-speed/high-load operation zone which make an exhaust gas temperature increase.

The reformed gas generated by the above reforming reaction flows into the intake pipe 12 through the reforming gas passages 36 so as to be mixed with intake air. At this stage, the ECU 50 controls a recirculation volume of the reformed gas flowing into the intake pipe 12 by the flow regulating valve 40. Then, the reformed gas flows into the cylinders of the internal combustion engine 10 with the intake air. As a result, $H_2$ and CO in the reformed gas burn with fuel injected by the fuel injection device 18 in the cylinders.

As described above, the heat quantity of the reformed gas is increased compared to that of the previous fuel by the heat amount corrected from the exhaust gas by the heat exchanger 24 in this case. Therefore, it is possible to improve a fuel consumption efficiency of the internal combustion engine 10 because the heat efficiency of the whole system increase when the reformed gas is burned in the internal combustion engine 10. In addition, the heat exchanger 24 can heat the fuel reforming catalyst 28 by using the heat of the exhaust gas, without a heater and energy to heat the catalyst. Therefore, it is possible to construct a system of an exhaust heat correction type having a high operating efficiency.

Furthermore, the recirculation of the reformed gas into the intake system achieves an effect of EGR (Exhaust Gas Recirculation). In general, there is a limit in the EGR rate since the combustion state becomes unstable as the EGR rate increases. However, according to the system of the first embodiment, it is possible to raise the upper limit of the EGR rate since the EGR gas is constituted by the reformed gas which contains $H_2$ of high combustibility. Accordingly, it becomes possible to recirculate a large quantity of the reformed gas into the intake system, this can improve the fuel consumption efficiency and the exhaust emission.

Characteristic Part of the First Embodiment

As can be understood from the above description, the reforming reaction is not smoothly proceeded when the temperature of the fuel reforming catalyst 28 is too low. If the reforming fuel is injected from the reforming fuel injector 34 under such a situation, there arises a possibility that the emission is deteriorated due to reforming fuel remaining in the catalyst in a non-reacted state or that the temperature of the catalyst 28 is raised to an unusual high level due to unnecessary burning of the remaining fuel that occurs afterward.

To avoid things like this, it is preferable that the injection of the reforming fuel is suspended when the temperature of the catalyst 28 is lower than a minimum operating temperature which is necessary for the catalyst 28 to cause the reforming reaction stably. However, the minimum operating temperature changes depending on a mixture ratio of gasoline and ethanol in the fuel.

Figure 2:
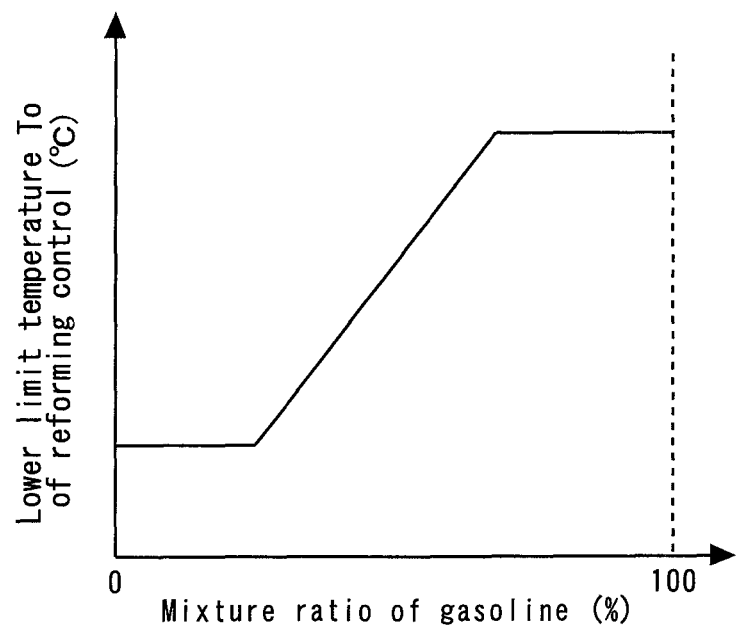
FIG. 2 is a figure of a characteristic line which shows a relationship between mixture ratio of gasoline in a reforming fuel and a lower limit temperature of reforming control.

So, in the system of the first embodiment, the ECU 50 varies a lower limit temperature "$T_0$" corresponding to the minimum operating temperature depending on the mixture ratio of the reforming fuel. Further, when the temperature of the fuel reforming catalyst 28 (the estimated temperature "T" to be described later) is lower than the lower limit temperature "$T_0$", ECU 50 suspends the injection of the reforming fuel. FIG. 2 is a figure of a characteristic line which shows a relationship between the mixture ratio of gasoline in the reforming fuel and the lower limit temperature "$T_0$" of the reforming control. The data of this characteristic line is stored in the ECU 50 previously.

As shown in FIG. 2, the system of the first embodiment sets the lower limit temperature "$T_0$" to be higher as the mixture ratio of gasoline in the reforming fuel increases. This is based on the following reason. As described above, the reforming control causes the reforming reaction by using water in the exhaust gas. In this reaction, alcohol such as ethanol is more responsive than gasoline because of having hydroxyl.

Therefore, as the mixture ratio of ethanol in the fuel increases, the reforming reaction becomes apt to be started at a lower temperature during the reforming control. That is, as the mixture ratio of gasoline in the fuel increases, the minimum operating temperature of the fuel reforming catalyst 28 becomes higher since it becomes difficult to cause the reforming reaction at a lower temperature. Therefore, the characteristic line of the lower limit temperature "$T_0$" shown in FIG. 2 can be obtained by specifying a relationship between the mixture ratio of the reforming fuel and the minimum operating temperature of the catalyst 28 in an experiment.

As described above, by the first embodiment, it is possible to vary the lower limit temperature "$T_0$" of the reforming control depending on the mixture ratio of the reforming fuel. Further, it becomes possible to inject the reforming fuel only when the fuel reforming catalyst 28 is at a suitable temperature, and to suspend the injection of the reforming fuel in any other temperature by performing a temperature judgment using the lower limit temperature. Therefore, it is always possible to perform the reforming control stably under a suitable temperature condition even if the mixture ratio of the reforming fuel changes.

To describe in detail, when the mixture ratio of gasoline in the reforming fuel is high, the lower limit temperature "$T_0$" is set to be a high value. That is, in a case where fuel that has low reactivity for the reforming reaction because of high gasoline content is used, the reforming control is performed only within a comparatively high temperature range. Therefore, it is possible to prevent the reforming fuel from being injected under a low temperature condition unsuitable for the reforming reaction. As a result, the fuel reforming catalyst 28 is protected against adhesion of the fuel.

On the other hand, in a case where fuel that has low gasoline content (that is to say, having high ethanol content and high reactivity for the reforming reaction) is used, it is possible to set the lower limit temperature "$T_0$" to be a lower value based on a mixture ratio of the fuel. This can enlarge the temperature range to perform the reforming control as much as possible. Therefore, it is possible to improve the efficiency of the reforming control so as to improve the fuel consumption efficiency and the exhaust emission.

(Temperature Estimation of the Fuel Reforming Catalyst)

In the system of the first embodiment, the ECU 50 is configured so as to estimate a temperature of the fuel reforming catalyst 28. In this estimating process, at first, the ECU 50 detects operating conditions of the internal combustion engine 10 such as an engine speed, an intake air quantity, a load condition and etc. In addition, the ECU measures an amount of time during which the engine continues to run from the start-up. With the use of these operating conditions and the amount of time, the ECU 50 calculates an estimated temperature "T" of the fuel reforming catalyst 28 by a heretofore known way.

That is, the temperature of the fuel reforming catalyst 28 increases, for example, when a high-speed or high-load operation is performed, whereas decreasing when a low-speed or low-load operation is performed. In addition, the temperature of the catalyst 28 increases as a duration time of the operation becomes longer for a short while from the start-up of the internal combustion engine 10. Therefore, the estimated temperature "T" of the catalyst 28 can be calculated based on these tendencies.

(Correction of the Estimated Temperature)

When the reforming fuel injected by the reforming fuel injector 34 has come at a position of the fuel reforming catalyst 28 through the diverged pipe 32, the reforming fuel evaporates from a surface and a neighborhood of the catalyst 28 by heat of the exhaust gas flowing through the exhaust passage 30. Since the evaporation absorbs evaporation heat from around the catalyst 28, the temperature of the fuel reforming catalyst 28 decreases.

Figure 3:
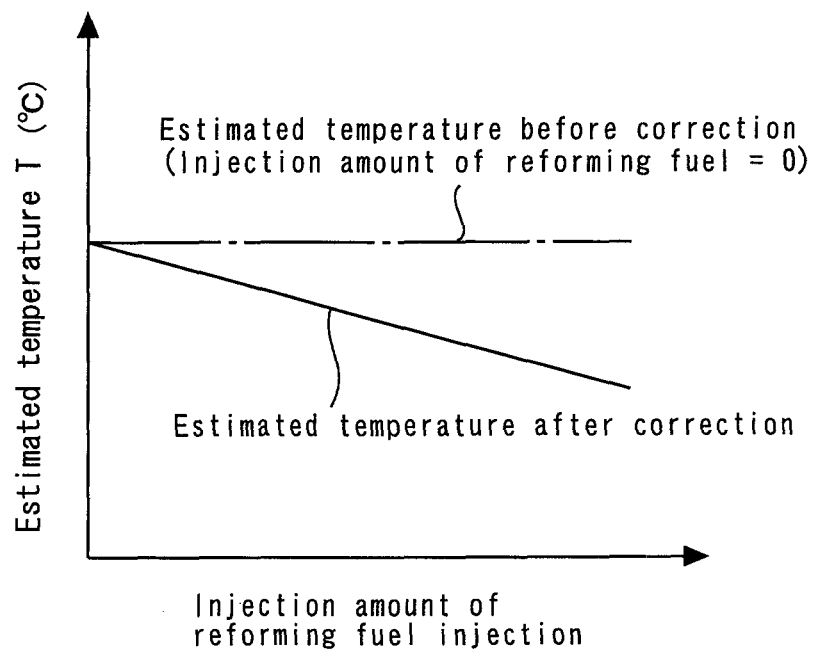
FIG. 3 is an explanation drawing to show a content of correction for correcting an estimated temperature of a reforming fuel catalyst based on an injection amount of the reforming fuel.

Consequently, the system of the first embodiment is configured so as to correct the estimated temperature "T" based on an injection amount of the reforming fuel. FIG. 3 is an explanation drawing for showing a relationship between the estimated before-and-after correction temperatures "T" and an injection amount of the reforming fuel. The alternate long and short dash line in FIG. 3 shows the estimated temperature "T" before correction, corresponding to a status in which the injection amount of the reforming fuel is zero. The full line in FIG. 3 shows the estimated temperature "T" after correction.

The evaporation heat radiated from the fuel reforming catalyst 28 with the evaporation of the reforming fuel increases as the injection amount of the reforming fuel increases. Therefore, as shown in FIG. 3, the ECU 50 performs the correction so that the estimated temperature "T" is lowered as the injection amount of the reforming fuel increases. It should be noted that the correction shown in FIG. 3 is merely an example in the first embodiment. The correction does not limit the present invention.

According to this correction, an effect of the fuel evaporation can be reflected to the estimated temperature "T" even in a case where the reforming fuel evaporates near the fuel reforming catalyst 28 as shown in the first embodiment. Further, it is possible to precisely estimate the temperature of the fuel reforming catalyst 28 even in a case where the injection amount of the reforming fuel varies. Therefore, it is possible to precisely perform the above mentioned temperature judgment using the lower limit temperature "To" so as to perform the reforming control at a right timing.

Details of Process Performed by First Embodiment

FIG. 4 is a flowchart of the routine performed by the ECU 50 to realize the operation of the first embodiment. The routine shown in FIG. 4 is started at the time when the internal combustion engine starts up, and repeated by a fixed time interval.

First of all, in step 100, a detected signal of the fuel property sensor 52 is read. In step 102, a mixture ratio of the fuel is calculated with the use of the detected signal. Then, in step 104, a lower limit temperature "$T_0$" for the reforming control is calculated based on the mixture ratio of the fuel by referring to the characteristic line data shown in FIG. 2 and stored previously on the ECU 50.

Next, in step 106, an estimated temperature "T" of the fuel reforming catalyst 28 is calculated based on the operating condition of the internal combustion engine 10 and the amount of time during which the engine continues to run. Further, in step 108, the estimated temperature "T" is corrected based on the injection amount of the reforming fuel. The injection amount of the reforming fuel used in this correction is defined as a total amount of the fuel that influences the present temperature of the fuel reforming catalyst 28. Concretely speaking, for example, the amount of the reforming fuel injected while the loop from step 106 to step 118 is executed in the last time cycle may be used for the correction of the estimated temperature "T" in the current cycle.

Next, in step 110, it is judged whether the estimated temperature "T" of the fuel reforming catalyst 28 is higher than or equal to the lower limit temperature "$T_0$". If the judgment result indicates that the estimated temperature "T" is higher than or equal to the lower limit temperature "$T_0$", the routine moves into step 114-118 to be described later because that the fuel reforming catalyst 28 has been moderately-heated.

On the other hand, if the judgment result of step 110 indicates that the estimated temperature "T" is lower than the lower limit temperature "$T_0$", the routine moves into step 112 because that the temperature of the fuel reforming catalyst 28 is too low to perform the reforming control. Then, in step 112, the injection of the reforming fuel is suspended so as to terminate the present cycle.

Next, in step 114, the injection amount of the reforming fuel is corrected based on the estimated temperature "T" to inject the reforming fuel. The largest amount of fuel which the fuel reforming catalyst 28 can treat depends on a temperature of the catalyst 28. Therefore, the process of step 114 can avoid a status in which a part of the injection fuel is left in the catalyst 28. In addition, a basic injection amount of the reforming fuel is decided according to, for example, an operating condition of the internal combustion engine 10, a mixture ratio of the fuel, a temperature of the fuel reforming catalyst 28 and the like.

Then, in step 116, reforming fuel corresponding to the corrected amount is injected into the diverged pipe 32 from the reforming fuel injector 34. Consequently, the reforming gas is generated due to the effect of the fuel reforming catalyst 28 as above-described. This reforming gas is recirculated into the intake system by a volume corresponding to the gate opening of the flow regulating valve 40. In addition, the ECU 50 performs a control routine of the flow regulating valve 40 in parallel with the routine shown in FIG. 4 although the former control routine is omitted to show by a figure.

Next, in step 118, it is judged whether the timing to terminate the reforming control has come by, for example, judging whether a target amount of the reforming fuel is actually injected. If it is judged that the timing has come, the reforming control is terminated immediately. On the other hand, if it is judged that the timing has not come yet, the loop from step 106 to step 118 is repeatedly performed until the timing to terminate the reforming control has come.

As above-described in detail, in accordance with the first embodiment, it is possible to set the lower limit temperature "$T_0$" of the reforming control to a suitable value based on a property of the fuel. Therefore, it is possible to enlarge the temperature range in which the reforming control is performed as much as possible so as to always perform the reforming control under a suitable temperature condition.

In the first embodiments of the present invention described heretofore, the step 106 in FIG. 4 represents specific examples of the temperature acquisition means. The step 104 represents specific examples of the lower limit temperature calculating means and the step 112 represents specific examples of the reforming fuel suspending means. Further, the step 108 represents specific examples of the estimated temperature correcting means.

In accordance with the first embodiment of the present invention, the temperature of the fuel reforming catalyst 28 is estimated with use of the software. The present invention is not limited to one using this estimation process. Alternatively, the catalyst temperature sensor 54 may be used as the temperature acquisition means. That is, the catalyst temperature sensor 54 may detect temperature of the fuel reforming catalyst 28 so that the ECU 50 variably set the lower limit temperature "$T_0$" based on the detected result.

In accordance with the first embodiment of the present invention, a blend fuel of gasoline and ethanol is used as the reforming fuel. The present invention is not limited to this. Alternatively, a blend fuel of gasoline and other kind of alcohol such as methanol may be used as the reforming fuel.

Further, in accordance with the first embodiment of the present invention, the fuel reforming catalyst 28 is heated by using heat of the exhaust gas. The present invention is not limited to one that uses the exhaust heat, being able to be applied to an internal combustion engine which does not correct the heat of the exhaust gas. Namely, in the present invention, the fuel reforming catalyst 28 may be heated by a heating source except the exhaust gas (for example, a special heater for the catalyst).

The invention claimed is:

1. An internal combustion engine comprising:
   a fuel reforming catalyst including a heating unit, the fuel reforming catalyst generating combustible gas from reforming fuel by using heat of the heating unit;
   a reforming fuel supplying unit that supplies blended fuel of gasoline and alcohol to the fuel reforming catalyst as the reforming fuel;
   a temperature acquisition unit that acquires a temperature of the fuel reforming catalyst;
   a mixture ratio detecting unit that detects a mixture ratio of the gasoline and the alcohol contained in the reforming fuel;
   a lower limit temperature calculating unit to variably set a lower limit temperature necessary to activate the fuel reforming catalyst based on the mixture ratio detected by the mixture ratio detecting unit;
   a reforming fuel suspending unit to suspend supply of the reforming fuel when the temperature acquired by the temperature acquisition unit is lower than the lower limit temperature; and
   a memory circuit which stores a characteristic data to set the lower limit temperature to be higher as the mixture ratio of the gasoline in the reforming fuel increases,
   wherein the lower limit temperature calculating unit is configured to set the lower limit temperature to be higher as the mixture ratio of the gasoline in the reforming fuel increases based on the characteristic data stored in the memory circuit.

2. The internal combustion engine according to claim 1, wherein the temperature acquisition unit estimates the temperature of the fuel reforming catalyst based on an operating condition of the internal combustion engine, and the internal combustion engine further comprising an estimated temperature correcting unit that corrects the estimated result of said temperature based on a supplying amount of the reforming fuel.

3. The internal combustion engine according to claim 2, wherein the estimated temperature correcting unit corrects the estimated result of said temperature so as to be lowered as the supplying amount of the reforming fuel increases.

4. The internal combustion engine according to claim 3, wherein the heating unit includes a heat exchanger which heats the fuel reforming catalyst by using heat of the exhaust gas.

5. The internal combustion engine according to claim 2, wherein the heating unit includes a heat exchanger which heats the fuel reforming catalyst by using heat of the exhaust gas.

6. The internal combustion engine according to claim 1, wherein the heating unit includes a heat exchanger which heats the fuel reforming catalyst by using heat of the exhaust gas.

7. An internal combustion engine comprising:
- a fuel reforming catalyst including a heating unit, the fuel reforming catalyst generating combustible gas from reforming fuel by using heat of the heating unit;
- a reforming fuel supplying unit that supplies blended fuel of gasoline and alcohol to the fuel reforming catalyst as the reforming fuel;
- a temperature acquisition unit that acquires a temperature of the fuel reforming catalyst;
- a mixture ratio detecting unit that detects a mixture ratio of the gasoline and the alcohol contained in the reforming fuel;
- a control unit that variably sets a lower limit temperature necessary to activate the fuel reforming catalyst based on the mixture ratio detected by the mixture ratio detecting unit and the control unit suspends supply of the reforming fuel when the temperature acquired by the temperature acquisition unit is lower than the lower limit temperature; and
- a memory circuit which stores a characteristic data to set the lower limit temperature to be higher as the mixture ratio of the gasoline in the reforming fuel increases, wherein the control unit is programmed to increase the lower limit temperature as the mixture ratio of the gasoline in the reforming fuel increases based on the characteristic data stored in the memory circuit.

8. The internal combustion engine according to claim 7, wherein the temperature acquisition unit estimates the temperature of the fuel reforming catalyst based on an operating condition of the internal combustion engine, and the control unit corrects the estimated result of said temperature based on a supplying amount of the reforming fuel.

9. The internal combustion engine according to claim 8, wherein the control unit corrects the estimated result of said temperature so as to be lowered as the supplying amount of the reforming fuel increases.

10. The internal combustion engine according to claim 7, wherein the heating unit includes a heat exchanger which heats the fuel reforming catalyst by using heat of the exhaust gas.

* * * * *